Sept. 19, 1939. W. G. HOELSCHER 2,173,557
TAPERING ATTACHMENT FOR LATHES
Filed Aug. 29, 1938 3 Sheets-Sheet 1
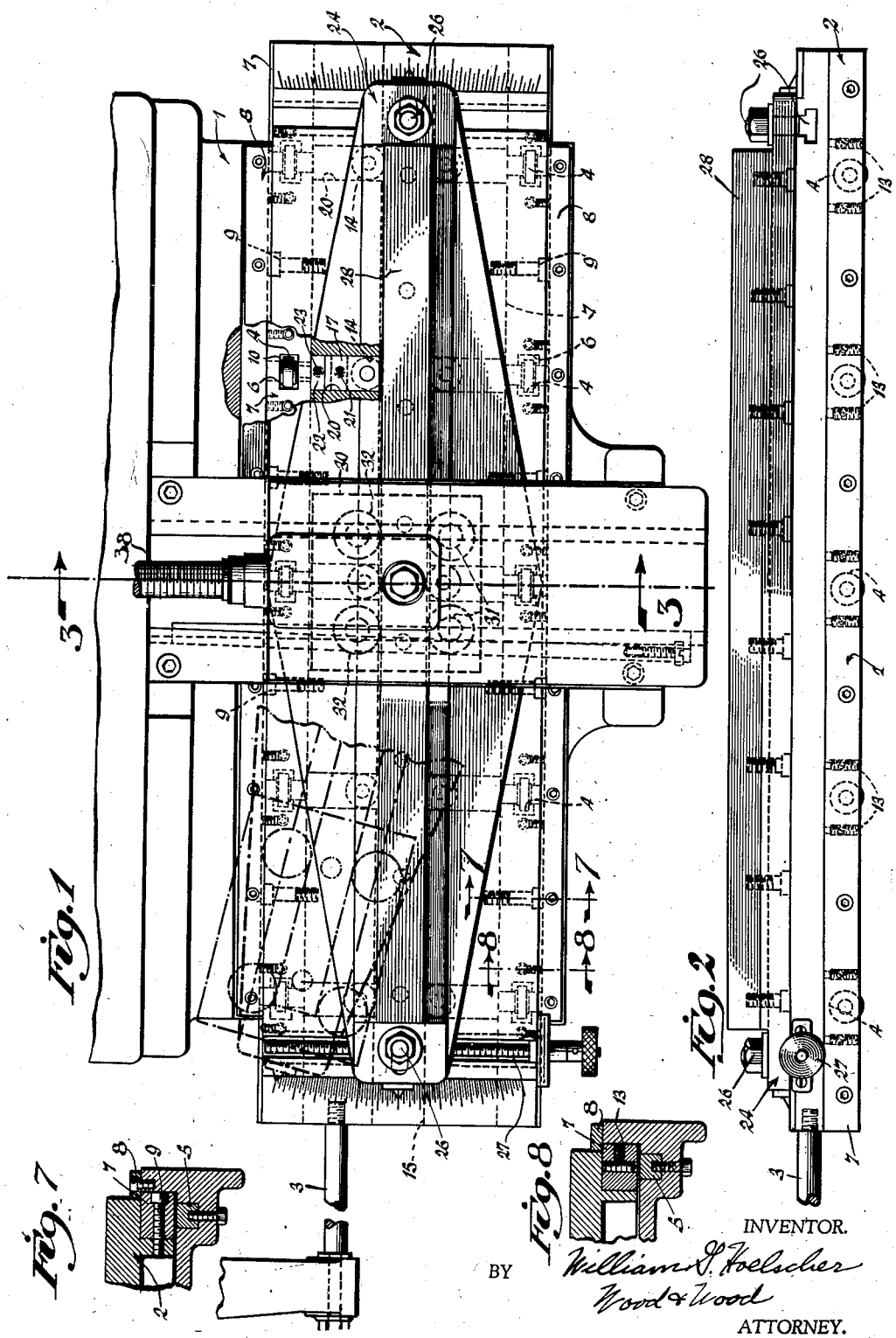
INVENTOR.
William G. Hoelscher
BY Wood & Wood
ATTORNEY.

Sept. 19, 1939.   W. G. HOELSCHER   2,173,557
TAPERING ATTACHMENT FOR LATHES
Filed Aug. 29, 1938   3 Sheets-Sheet 2

INVENTOR.
William G. Hoelscher
BY Wood & Wood
ATTORNEY

Sept. 19, 1939.   W. G. HOELSCHER   2,173,557

TAPERING ATTACHMENT FOR LATHES

Filed Aug. 29, 1938   3 Sheets-Sheet 3

INVENTOR.
William G. Hoelscher
BY Wood & Wood
ATTORNEY.

Patented Sept. 19, 1939

2,173,557

UNITED STATES PATENT OFFICE 2,173,557

TAPERING ATTACHMENT FOR LATHES

William G. Hoelscher, Norwood, Ohio, assignor to The American Tool Works Company, Cincinnati, Ohio, a corporation of Ohio Application August 29, 1938, Serial No. 227,245

12 Claims. (Cl. 82—17)

This invention relates to an anti-friction taper attachment for machine tools of the character of an engine lathe. The conventional taper attachment usually consists of a bracket fixed to the tool carriage to move therewith and support a slide or swivel plate held against motion. The swivel plate carries a taper bar, adjustable thereon to set the same to different angular positions. The taper bar has a shoe slidable thereon and in connection with the tool carrying slide on the carriage so that as the carriage is advanced upon the bed of the lathe, the taper bar moves the shoe for turning the work to a determined taper governed by the angular position of the taper bar.

The general practice has been to employ a dovetailed sliding connection between relative moving parts for rigidly sustaining the same against vertical and lateral movements or play so as to avoid any possible chatter or irregularities which may be transcribed to the tool and work. This form of connection produces considerable friction which materially increases as the angular setting of the taper bar is increased attributing to a limit of angle at which the taper bar can be set and allow the parts to slide without binding or imposing excessive strain upon the parts. By relieving the parts of friction, a greater range of adjustment of the taper bar is made possible.

An object of the invention is to join the relatively movable or translatable parts of a taper attachment by anti-friction means for ease of travel and to have the anti-friction means adjustable or regulatable, primarily to accommodate for the manufacturing and tolerance in the bearings of ball bearing journalled rollers, to set the rollers of a series in uniform treading contact upon the surface of which they traverse, in order to obtain the required rigidity in the assembly of the relatively moving parts.

Another object of the invention is to guidingly and slidingly connect the relatively moving parts of a taper attachment by anti-friction journalled rollers traversing against or upon rails.

Another object of the invention is to provide anti-friction journalled rollers for a guide and slide wherein a plurality of rollers are disposed at relatively longitudinally spaced points and mounted upon a bar or frame fixed either to the guide or slide and to align the tread surfaces of the rollers so as to have uniform contact with the surface upon which they ride by stressing the bar away from its seat at one or opposite sides of each roller requiring adjustment or regulation.

Other objects and further advantages will be more fully described from the description of the accompanying drawings, in which:

Figure 1 is a top plan view of an improved taper attachment as applied to the rear end of the carriage of an engine lathe.

Figure 2 is a side elevation of the slide and guide bar of the taper attachment.

Figure 7 is a section on line 7—7 of Figure 1.

Figure 8 is a section on line 8—8 of Figure 1.

Figure 3:
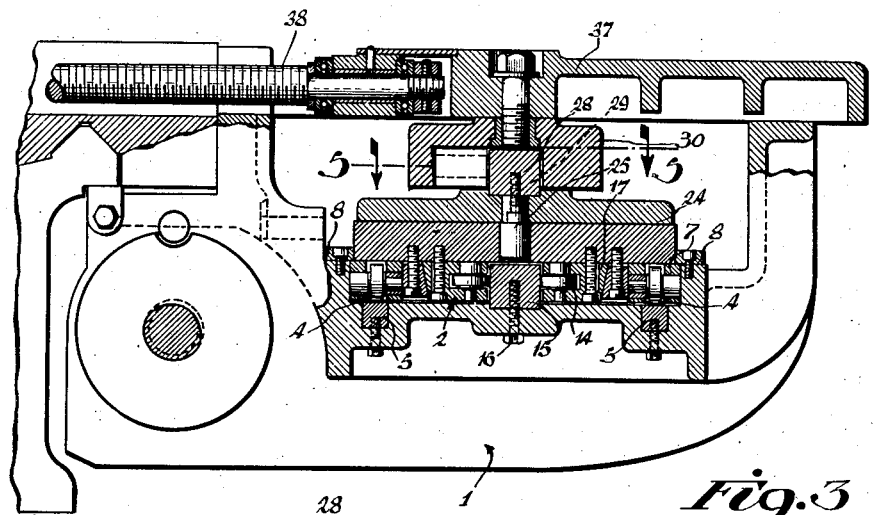
Figure 3 is a section on line 3—3 of Figure 1.
Figure 4:
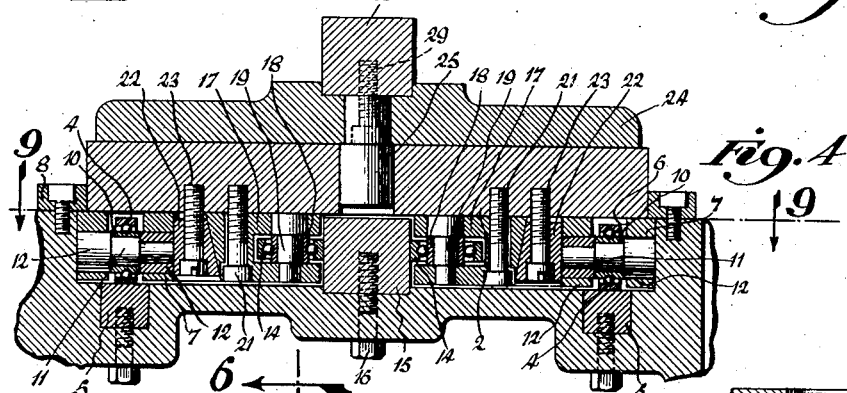
Figure 4 is an enlarged central, vertical section of a portion of the bracket slide and guide bar as illustrated in the similar section, Figure 3.
Figures 5, 6:
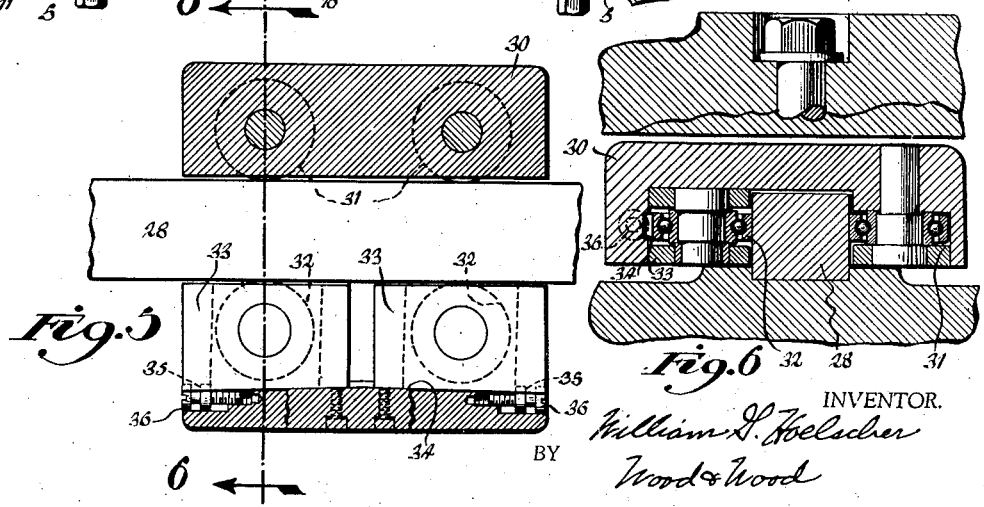
Figure 5 is an enlarged section on line 5—5 of Figure 3.
Figure 6 is a section on line 6—6 of Figure 5.
Figure 9:
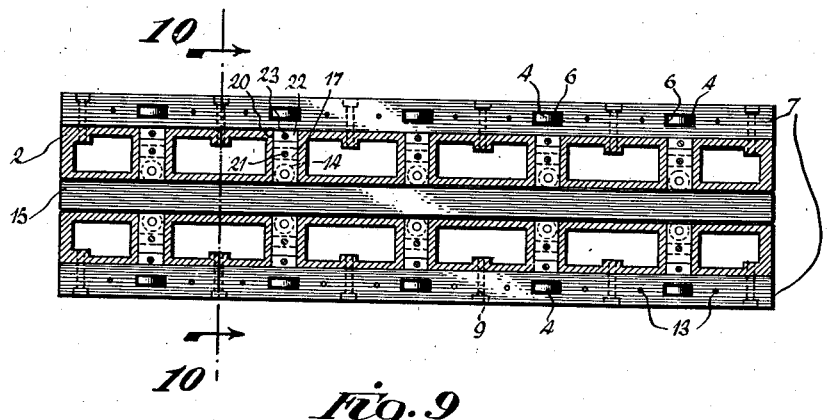
Figure 9 is a bottom plan view of the slide.
Figure 10:
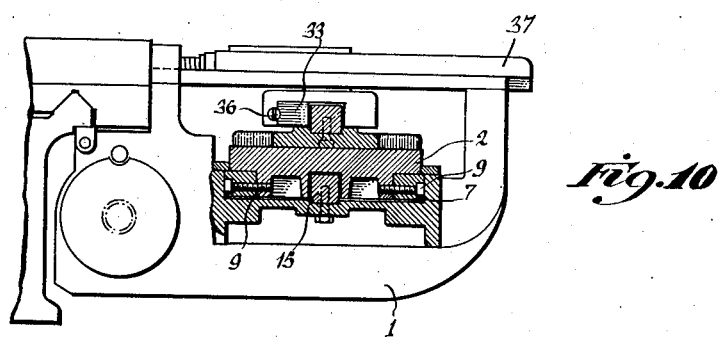
Figure 10 is a section on line 10—10 of Figure 9.
Figure 11:
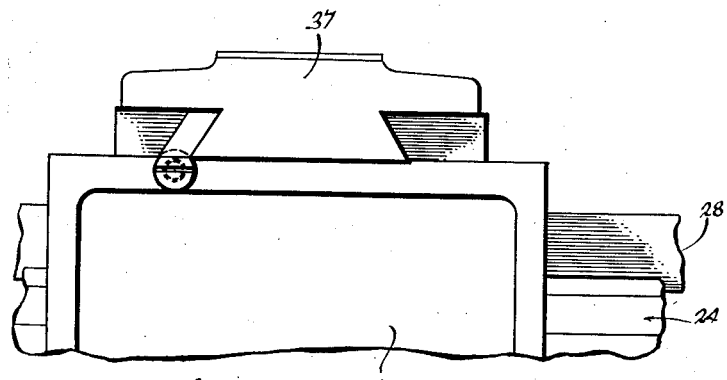
Figure 11 is a rear end view of the upper end of the bracket and plate connecting the shoe to the tool holding slide.

Referring to the drawings 1 indicates a bracket fixed in a conventional manner to the rear end of a lathe carriage and with the various elements of the taper attachment, which the bracket supports, providing a self-contained unit on the rear end of the carriage, forming either a part of the equipment of a new lathe or readily installed upon a used lathe, following the general practice.

The upper side of the bracket is longitudinally channeled to provide a slideway parallel with the lathe bed and travel of the carriage within which a slide 2 is recessed and supported. The slide at one end has a rod 3 attached thereto and projecting therefrom to extend parallel with the lathe bed, and to which it is fixed, at its forward end, by a clamp arm for attachment to the lathe bed in the usual manner. The slide 2, fixed to the lathe bed is therefore held against longitudinal movement, while the bracket, as a rear extension of the carriage, travels with the carriage in its feeding traverse on the bed. The slide is sustained upon the bracket by a plurality of anti-friction journalled rollers, disposed at opposite longitudinal sides of the slide and in aligned pairs.

The longitudinal series of slide sustaining rollers 4 ride upon a rail 5 as a rectangular bar of wear resistant material, recessed within the base of the channel in the bracket and secured by screws at spaced intervals extending vertically through the bracket from the underside thereof. The rails provide a hard metal surface track for the roller resisting wear and have a hardened bar inserted within the base of the channel in the bracket which forms a simple and efficient method of construction. Each roller 4 is of ball bearing journalled type mounted to extend within an aperture 6 in a dolly or truck bar 7 fixed within a rabbet to the underside of the slide so that the rollers are completely housed. The series of rollers for the number employed for each of the opposite sides of the slide are all mounted within a dolly or truck bar 7 and as shown, the bar, at its outer edge, projects slightly or overlies the side edge of the slide to be overlapped by a guide bar 8 rigidly fixed to the bracket and having an edge slidably bearing against the adjoining edge of the slide. The dolly bar 7 is fixed to a side wall of the rabbet in the slide by bolts 9 at suitably spaced intervals, the bolts extending transversely through the bar at points centrally intermediate of each tandem pair of rollers.

Each roller unit comprises a pair of concentric rings with balls interposed therebetween seating in annular raceways opposingly formed in said rings. The inner ring 10 is of slightly extended width and supported upon a stepped stud shaft or axle 11 having its opposite ends engaged within bushings 12—12 mounted within the bar 7 and the opposite ends of the inner ring abuttingly engage with the adjoining edges of the bushings. The rollers are arranged at uniform spacing longitudinally of the slide and are of a number to adequately support the slide for any portion of its length directly sustained by the bracket, recognizing that the opposite longitudinal ends of the slide may move off or extend beyond the length of the bracket in its full traverse with the carriage.

The dolly bar 7, at each of the opposite sides of the axis of a roller, is provided with leveling screws 13—13 extending perpendicularly through the bar to bear against the upper wall of the rabbet in the slide to thrust or stress the bar within the vicinity of the roller to accommodate for any slight elevation regulation that may be required to relatively draw up the rollers of a series and, as may be necessary, to eliminate any possible chatter or play in the bracket and slide assembly.

The bracket is guided by anti-friction rollers and sustained against lateral chatter or play induced by thrusts, strains, or stresses. The guide rollers preferably are arranged in a series at each of the opposite sides of a thrust rail 15, located centrally and longitudinally of the guide channel in the bracket, the rollers rotating on a vertical axis and mounted within the slide. The lower side of the rail 15 is slightly recessed within a groove in the base of the channel to provide a shouldered seat therefor, and it is fixed to the bracket by bolts 16 extending vertically therethrough from the underside thereof.

The rollers and their method of mounting for each of the series at opposite sides of the guide or thrust rail are of duplicate construction and adapted for independently adjusting or regulating each roller so that it can be accurately and delicately set to insure a proper rolling contact against the rail and position each roll so that all rollers of both series will be appropriately affected. As the structure and mounting of the rollers are the duplicate of one another, the detailed description thereof is confined to the singular.

Each roller 14 is of ball bearing journal type housed within a bifurcation of a bearing block 17 and similarly to the load sustaining rollers, comprise a pair of concentric rings having balls interposed therebetween, seating and riding in annular grooves or raceways opposingly formed in said rings. The inner ring 18 is of extended width and mounted upon a stub axle or shaft 19. The stub axle or shaft 19 is mounted within the bearing block 17. The bearing block 17 is engaged within a lateral groove 20 in the underside of the slide and fixed in place to the slide by a vertical extended bolt 21. The rear end of the bearing block is beveled and engages with a wedge 22, adjustable and fixed by a bolt 23 passing vertically through the wedge and screw threaded into the underside of the slide. The bolt receiving aperture, through the bearing block, is of slightly enlarged diameter over that of the bolt to provide sufficient tolerance, enabling it to be slightly adjusted by the wedge 22 to appropriately bring the roller into bearing contact with the thrust rail to take up for any play or irregularity that may exist and adapt each roller to serve effectively, all being set for a uniform bearing contact with the rail and thereby avoiding any chatter or lateral play of the slide upon and within its guide.

The adjustment ordinarily is very minute and need only be sufficient to take care of any irregularities which are more or less present in the manufacture and assembly of the parts of this character, it being highly desirable to provide for a very accurate bearing contact of all of the rollers to avoid any possible chatter or play, while at the same time allowing enough freedom for easy traverse of the slide or bracket, the adjustment primarily being for initial setting of the parts, the construction providing for extremely long periods of use under heavy duty before additional adjustment need be made.

In providing the slide with plural sets of anti-friction rollers, one for load sustention and a second for lateral thrust, all traveling upon rails, with each roller individually set for a proper rolling contact with the rail, the slide and bracket can be relatively, freely traversed with a riding stability void of any quiver or chatter which is extremely vital for this type of machine, in which any deviation from its absolutely straight course will misguide or move the cutting tool under the control of the taper attachment from a predetermined line of cut. The free and easy riding of the moving parts under heavy pressure and stresses permits the making of heavy cuts and to a degree of taper that otherwise would not be possible without overloading the working capacity of the machine, impairing its proper functioning, or resulting in injurious strain to the parts thereof.

The underside of the slide is centrally grooved for its entire length to furnish the necessary clearance for the central rail and roller protrusion for contact with the rail. As the travel of the slide is entirely upon rails, as hardened metal inserts, within the channel of the bracket, the adjoining surfaces of the slide and bracket need only be roughly finished as they have no bearing contact.

An obliquely adjustable guide bar 24 is pivotally mounted upon the slide and normally is fixed thereto. It follows the customary practice of swinging on a central pivot 25 and at each of its opposite longitudinal ends carries T-bolts 26, each traversing an elongated slot in the bar with the head of the bolt engaged within a lateral T-slot in the upper face of the slide. The slide is adjusted to any desired angle by means of a hand-operated screw 27 journalled in the slide and cooperating with a nut carried by the guide bar.

After an angle adjustment has been made, the bar is rigidly clamped to the slide by the T-bolts 26. The upper face of the slide at its opposite ends, is provided with the usual sets of graduated scales and the bar with pointers for convenience in setting. The slide bar, at its upper side, centrally longitudinally thereof, is equipped with a slide rail 28, longitudinally set in a groove in the bar and rigidly secured thereto by bolts 29 at spaced points for the length of the rail. A shoe 30, adapted for connection with the tool slide of the lathe when the attachment is in use, straddles the slide rail and is in traveling contact therewith by means of a plurality of ball bearing journalled rollers 31—31, 32—32, arranged in spaced sets relatively at opposite sides of the rail and opposite sides of the axis connecting the shoe to the rearward extension of the tool bracket or slide, thereby providing a definite anti-friction connection of the shoe and slide.

The specific number and arrangement of rollers is provided to stabilize the shoe connection with the side rail and avoid any canting of the shoe which would have a disturbing influence to the relative transmitting connection between the slide bar and the tool slide. The rollers 31—31 on one side of the slide rail are mounted upon a fixed stud and therefore are non-adjustable, while the rollers 32—32 at the opposite side of the rail are adjustably mounted, each individually or independently of the other. The preferred means for mounting each of the rollers 32—32 comprises a bearing block 33 longitudinally apertured to receive and house a roller. The roller is ball bearing journalled in construction, as heretofore described, for the mounting of the thrust rollers upon the slide. The outer edge of the block is angled or tapering and bears against an inclined surface 34 of the shoe. The forward or outer end of the bearing block is provided with a laterally extending lug 35 connecting with an adjusting screw 36 secured to the bar, the side of the shoe 30 being suitably notched to receive the head of the adjusting screw 36. The head of the screw engages one side of the lug 35 while the opposite side of the lug is engaged by a collar fixed upon the screw, thereby rotatably connecting the screw to the bearing block to permit it to be rotated for adjustment. Upon adjusting the bearing block inwardly, the roller is moved toward the slide rail to take up any play between the rail and the opposite roller 31.

The shoe 30 connects with a tool connecting slide plate 37 bridging and slidably mounted upon the upper side of the bracket, within a dovetailed slideway, and connects at its forward end with the cross speed screw 38 of the lathe tool slide. Mounting the tool connecting slideway 37 within a relatively stationary guide above the shoe prevents any lifting tendency under heavy cuts, provides a rigid support for the cross speed screw journal, and absorbs all angular thrust without any clamping of the tool rest slide, thereby imparting very free movement without chatter.

Having described my invention, I claim:

1. A taper attachment for lathes or the like machine tool in combination with a cutting tool holding carriage of the machine tool, of a bracket rigidly supported by the carriage for translation therewith and formed to provide a slideway, a slide carrying an adjustable taper bar traversing in the slideway of the bracket, a series of anti-friction journalled rollers respectively at opposite longitudinal sides of said slide for supporting the same and traveling upon the bracket within the slideway thereof, a rail fixed to and within the slideway of said bracket, longitudinally of the slide, anti-friction journalled rollers carried by the slide, respectively at opposite sides of the rail for guidingly sustaining said slide, and a shoe slidable upon said taper bar of the slide for connection with the tool holding slide of the carriage.

2. A taper attachment for lathes or the like machine tool in combination with a cutting tool holding carriage of the machine tool, of a bracket rigidly supported by the carriage for translation therewith and formed to provide a slideway, a slide carrying an adjustable taper bar traversing in the slideway of the bracket, anti-friction means translatably supporting the slide upon the bracket within the slideway thereof, a rail of wear resistant material fixed to and within the slideway of said bracket centrally, longitudinally of the slide, anti-friction journalled rollers carried by the slide, respectively at opposite sides of the rail for guidingly sustaining said slide, and a shoe slidable upon said taper bar of the slide for connection with the tool holding slide of the carriage.

3. A taper attachment for lathes or the like machine tool in combination with a cutting tool holding carriage of the machine tool, of a bracket rigidly supported by the carriage for translation therewith, a slide supported upon the bracket and carrying an adjustable taper bar, anti-friction means interposed between the bracket and slide, translatably sustaining the slides upon the bracket, a rail fixed to said bracket longitudinally of the slide, anti-friction means interposed between the slide and rail for guidingly sustaining said slide upon the bracket, and a shoe slidable upon said taper bar of the slide for connection with the tool holding slide of the carriage.

4. A taper attachment for lathes or the like machine tool in combination with a cutting tool holding carriage of the machine tool, of a bracket rigidly supported by the carriage for translation therewith, a slide translatively supported upon said bracket and within a channel therein, and carrying an adjustable taper bar, a series of anti-friction journalled rollers respectively at opposite longitudinal sides of said slide for supporting the same, rails of wear resistant material for tracking said series of rollers, seated and fixed within the channel of said bracket, a rail of wear resistant material fixed to and within the channel of said bracket longitudinally of the slide, anti-friction journalled rollers carried by the slide, respectively at opposite sides of the rail for guidingly sustaining said slide, and a shoe slidable upon said taper bar of the slide for connection with the tool holding slide of the carriage.

5. A taper attachment for lathes or the like machine tool in combination with a cutting tool holding carriage of the machine tool, of a bracket rigidly supported by the carriage for translation therewith, a slide translatively supported upon said bracket, and carrying an adjustable taper bar, a rail of wear resistant material, fixed to said bracket longitudinally of the slide, anti-friction journaled rollers carried by the slide, respectively at opposite sides of the rail for guidingly sustaining said slide, and a shoe slidable upon said taper bar of the slide for connection with the tool holding slide of the carriage.

6. A taper attachment for lathes or the like machine tool in combination with a cutting tool holding carriage of the machine tool, of a bracket rigidly supported by the carriage for translation therewith, a slide translatively supported upon said bracket and carrying an adjustable taper bar, a rail of wear resistant material, fixed to said bracket longitudinally of the slide, anti-friction journalled rollers carried by the slide, respectively at opposite sides of the rail for guidingly sustaining said slide, each independently adjustable toward and from the rail to regulatably set the same in bearing contact therewith, and all of a series uniformly in contact with the rail, and a shoe slidable upon said taper bar of the slide for connection with the tool holding slide of the carriage.

7. A taper attachment for lathes or the like machine tool in combination with a cutting tool holding carriage of the machine tool, of a bracket rigidly supported by the carriage for translation therewith, a slide translatively supported upon the bracket, an adjustable taper bar, on said slide having a rail upon its upper side longitudinally therefor, anti-friction means interposed between the bracket and slide, translatably sustaining the slides upon the bracket, a rail fixed to said bracket longitudinally of the slide, anti-friction means interposed between the slide and rail for guidingly sustaining said slide upon the bracket, a shoe slidable upon said taper bar rail for connection with the tool holding slide of the carriage, and anti-friction means interposed between said taper bar rail and shoe.

8. A taper attachment for lathes or the like machine tool in combination with a cutting tool holding carriage of the machine tool, of a bracket rigidly supported by the carriage for translation therewith, a slide translatively supported upon the bracket and carrying an adjustable taper bar, a rail fixed to said bracket longitudinally of the slide, rollers interposed between the slide and rail and at relatively opposite sides of the rail for guidingly sustaining said slide upon the bracket, and a bearing block respectively journaling each roller, mounted in said slide and adjustable toward and from the rail, a shoe slidable upon said taper bar of the slide for connection with the tool holding slide of the carriage.

9. A taper attachment for lathes or the like machine tool in combination with a cutting tool holding carriage of the machine tool of a bracket rigidly supported by the carriage for translation therewith, a slide translatively supported upon said bracket, confined thereon against vertical displacement and carrying an adjustable taper bar, a rail of wear resistant material, fixed to said bracket longitudinally of the slide, anti-friction journalled rollers carried by the slide, respectively at opposite sides of the rail for guidingly sustaining said slide, a shoe slidable upon said taper bar of the slide for connection with the tool holding slide of the carriage, and anti-friction means interposed between said shoe and rail.

10. A taper attachment for lathes or the like machine tool in combination with a cutting tool holding carriage of the machine tool of a bracket rigidly supported by the carriage for translation therewith and formed to provide a slideway, a slide carrying an adjustable taper bar traversing in the slideway of the bracket, anti-friction means translatably supporting the slide upon the bracket within the slideway thereof, a rail of wear resistant material fixed to and within the slideway of said bracket centrally longitudinally of the slide, anti-friction journalled rollers carried by the slide, respectively at opposite sides of the rail for guidingly sustaining said slide, a rail of wear resistant material fixed to and extending longitudinally of the taper bar, a shoe slidable upon said taper bar rail for connection with the tool holding slide of the carriage, and anti-friction journalled rollers carried by said shoe respectively at opposite sides of said taper bar rail for guidingly sustaining the shoe.

11. A taper attachment for lathes or the like machine tool in combination with a cutting tool holding carriage of the machine tool of a bracket rigidly supported by the carriage for translation therewith, a slide carrying an adjustable taper bar traveling upon the bracket, anti-friction means translatably supporting the slide upon the bracket, a rail of wear resistant material fixed to said bracket centrally longitudinally of the slide, anti-friction means interposed between said rail and slide respectively at opposite sides of the rail for guidingly sustaining said slide, a shoe slidable upon said taper bar of the slide for connection with the tool holding slide of the carriage, a rail fixed to and extending longitudinally of the taper bar, and anti-friction means interposed between said taper bar rail and shoe respectively at opposite sides of the rail for guidingly sustaining said shoe.

12. A taper attachment for lathes or the like machine tools in combination with a cutting tool holding carriage of the machine tool of a bracket rigidly supported by the carriage for translation therewith, a slide translatively supported upon the bracket and carrying an adjustable taper bar, a truck bar, one for each of the opposite longitudinal sides of the slide, fixed to the lower side thereof, and carrying a plurality of anti-friction journalled rollers relatively at spaced points longitudinal of the bar to translatively support the slide upon the bracket, means for stressing the bar from its seat at opposite sides of each roller for independently setting each roller to bring all rollers in uniform bearing contact with the surface of the bracket upon which they travel, and a shoe slidable upon said taper bar of the slide for connection with the tool holding slide of the carriage.

WILLIAM G. HOELSCHER.